(12) United States Patent
Lin (10) Patent No.: US 9,827,571 B2
(45) Date of Patent: Nov. 28, 2017

(54) DRY GRANULATOR

(71) Applicant: Zhejiang Future Machinery Co., Ltd., Ruian, Zhejiang (CN)

(72) Inventor: Deping Lin, Ruian (CN)

(73) Assignee: Zhejiang Future Machinery Co., Ltd, Ruian, Zhejiang (CN)

( * ) Notice: Subject to any disclaimer, the term of this patent is extended or adjusted under 35 U.S.C. 154(b) by 395 days.

(21) Appl. No.: 14/621,322

(22) Filed: Feb. 12, 2015

(65) Prior Publication Data

US 2015/0239152 A1    Aug. 27, 2015

(30) Foreign Application Priority Data

| | | |
|---|---|---|
| Feb. 25, 2014 | (CN) | 2014 1 0062604 |
| Feb. 25, 2014 | (CN) | 2014 1 0062605 |
| Feb. 25, 2014 | (CN) | 2014 2 0079203 U |
| Feb. 25, 2014 | (CN) | 2014 2 0079204 U |
| Feb. 25, 2014 | (CN) | 2014 2 0079221 U |
| Feb. 25, 2014 | (CN) | 2014 2 0079224 U |
| Feb. 25, 2014 | (CN) | 2014 2 0079544 U |
| Feb. 25, 2014 | (CN) | 2014 2 0079574 U |

(51) Int. Cl.
*B02C 23/00* (2006.01)
*B02C 23/38* (2006.01)
(Continued)

(52) U.S. Cl.
CPC ............ *B02C 23/38* (2013.01); *B01J 2/22* (2013.01); *B02C 23/14* (2013.01); *B29B 9/04* (2013.01);
(Continued)

(58) Field of Classification Search
CPC . B02C 23/38; B02C 23/14; B02C 2018/0061; B29B 9/04; B29B 9/16; B01J 2/22
(Continued)

(56) References Cited

U.S. PATENT DOCUMENTS

| | | | |
|---|---|---|---|
| 3,375,985 A | * | 4/1968 | Dodgen ............. B01F 13/0035 241/101.6 |
| 3,700,179 A | * | 10/1972 | Van Peursem ......... A23N 17/00 198/545 |

(Continued)

*Primary Examiner* — Faye Francis
(74) *Attorney, Agent, or Firm* — Raymond Y. Chan; David and Raymond Patent Firm (57) ABSTRACT

A dry granulator includes a feeding mechanism applied to suck powder materials into the material tanks; a vertical feeding mechanism to deliver the power materials to a bottom outlet of the material tank; a pressing mechanism to compress the powder materials into powder sheets with qualified hardness and thickness; an oblique feeding mechanism to deliver the powder materials to from the vertical feeding mechanism to the pressing mechanism; a crushing mechanism to crush the powder sheets into crushed powder sheets; a granulating mechanism to granulate the crushed powder sheet into finished particles products, so as to deliver to a collection storage; a sieving mechanism to separate the finished particle products with fine powders; a pressing wheel regulator applied to adjust an axial position of the lower and the upper pressing wheel; and a floating sealing device applied to provide a reliable sealing effect for the feeding mechanism.

27 Claims, 8 Drawing Sheets

(51) Int. Cl.
  *B29B 9/04* (2006.01)
  *B29B 9/16* (2006.01)
  *B02C 23/14* (2006.01)
  *B01J 2/22* (2006.01)
  *B02C 18/00* (2006.01)
(52) U.S. Cl.
  CPC ........ *B29B 9/16* (2013.01); *B02C 2018/0061* (2013.01); *B29B 2009/168* (2013.01)
(58) Field of Classification Search
  USPC .................................. 241/101.4, 152.2, 230
  See application file for complete search history.

(56) References Cited

U.S. PATENT DOCUMENTS

| | | | | |
|---|---|---|---|---|
| 3,700,182 | A * | 10/1972 | Dediemar | B02C 4/32 241/230 |
| 4,577,805 | A * | 3/1986 | Seymour | A23N 17/007 241/101.76 |
| 5,005,980 | A * | 4/1991 | Zimmerman | B01F 7/00925 241/101.8 |
| 5,497,949 | A * | 3/1996 | Sharer | B03B 9/061 156/94 |
| 5,678,777 | A * | 10/1997 | Satake | B02C 4/06 241/227 |
| 6,149,083 | A * | 11/2000 | McFarland | B02C 18/302 241/186.5 |
| 7,361,401 | B2 * | 4/2008 | Desai | B29B 17/0026 428/323 |
| 7,726,593 | B2 * | 6/2010 | Heidel | A61L 11/00 241/186.5 |
| 8,870,104 | B2 * | 10/2014 | Levy | B03B 9/061 241/24.19 |
| 9,205,460 | B2 * | 12/2015 | Andersen | B07B 9/02 |

* cited by examiner

DRY GRANULATOR

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention related to a dry granulator, and more particularly to a dry granulator which is tight in structure, has reliable sealing ability of the feeding mechanism, has a high granulating efficiency, can provide high quality of finished particles products, has a low fine powder rate, is able to be applied to different kinds of mobile powders, and is easy to being automation production.

Description of Related Arts

Dry granulator is applied in the production of granular products, wherein the purpose of the dry granular is used to press variety of mobile powders into particle products with a predetermined and qualified particle size. Dry granular mainly includes a loading mechanism, a feeding mechanism, a pressing mechanism, a crushing mechanism, a granulating mechanism and a sieving mechanism. Dry granulator is already provided on the market for many years, but due to various kinds technical limitations, the current dry granulator commonly has the disadvantages of having a tight-less structure, unreliable sealing abilities of feeding mechanism, low granulating efficiency, and providing low quality of finished particles products (refer to technical parameters of sheet weights, hardness, and disintegration), and also has a high fine powder rate. Therefore, the current dry granulator cannot be applied to different kinds of mobile powders, and also have a difficult for being automation production.

Accordingly, the pressing mechanism is adapted to press powder materials delivering from the feeding mechanism, wherein the pressing mechanism comprises an upper pressing wheel and a lower pressing wheel, which are rotating in a counter direction. According to the prior art, a position of the lower pressing wheel is fixed, and the upper pressing wheel is driven by two hydraulic pressure cylinders, a front hydraulic pressure cylinder and a rear pressure cylinder, to remain a radial clearance between the upper and lower pressuring wheel while the pressing mechanism is working. A disadvantage of the above mentioned pressing mechanism is that the pushing force provided by the front and the rear hydraulic pressure cylinders will not fully balance, such that a front and rear end of pressing wheel shaft will produce different degrees of abrasion. At the same time, while the hydraulic oil in the hydraulic pressure cylinder is compressed and released, a certain amount of oil gas inevitably separate out to contaminate the high quality requirement of a granulating environment. Furthermore, since an axial position of the upper and lower pressing wheel is fixed and non-adjustable, so the height between an outer face end for the upper and lower pressing wheel has a certain degree of error, when the error exceeds 0.05 mm, the powder leakage phenomenon will generate on an area between the outer face end of the upper pressing wheel, the outer face end of the lower pressing wheel, and a cover arranged on the outer face end of the pressing wheel.

Accordingly, the feeding mechanism is adapted to deliver the powder materials to the pressing mechanism. In the current dry granular, the feeding mechanism comprises a feeding cylinder and a feeding screw rotatably mounted within the feeding cylinder. In order to improve the capacity and efficiency of the transportation for the powder materials, there are two feeding screws arranged within the feeding cylinder, wherein the feeding screws are tapered screws, and a top end of each of the two feeding screws is also designed as a tapered structure. Moreover, the anti-leakage method for the feeding mechanism, which is adapted to prevent the powder materials leaking from the rear end of the feeding cylinder, is only by sealing the rear end of the feeding cylinder, but in the practical application process, the leakage problem is difficult to be solved, and especially for the good mobility materials. Therefore, the anti-leakage method is an important technical problem for the current dry granulator.

Accordingly, the sieving mechanism is adapted to separate semi-finished particles products from the fine powder (containing fine particles) and qualified particles products. Currently, the sieving mechanism for the dry granular on the current market commonly has the disadvantages of that the sieving efficiency is low, the purity of the finished particles is poor, and the fine powder rate of the finished products is high, especially in the sieving process, flying dusts will generate to cause the environmental pollution. In order to solve the above mentioned problems, a patent application No. 201320285668.6 is filed on May 23, 2013 named "sieving mechanism for dry granular". Although, the above filed patent application is able to solve the above mentioned problems, but in the actual trial process, while the fine powders pass through meshes of the sieving tray and fall down to the powder receiving tray, the fine powder will not gather toward a center of the powder receiving tray (the fine powder will be efficiently sucked out due to a large pressure difference between an outlet adjacent to the center of the powder receiving tray), such that the fine powder will gather away from the center of the powder receiving tray. Even more, the fine powder will reversely overflow to pass through the meshes of the sieving tray to mix with the finished particles products, such that technical objectives of the present patent invention cannot be reached.

Accordingly, the crushing mechanism is adapted to granulate crushed powder sheets to produce qualified granulated particles products. Currently, the crushing mechanism for dry granular on the market includes a swing structure, a granulating wheel, and a mesh wheel structure, but all of the crushing mechanisms have the following disadvantages: poor granulating effects, high fine powder rates, and low granulating efficiency. In order to solve the above problems, a china patent application filed on May 23, 2013, having a patent application No. 201320285689.8, named "granulating mechanism for dry granular", is already applied. Although, the patented technologies of the above China patent application is able to solve the above problems, but the structure of the granulating mechanism in the above China patent application is relatively complex. Furthermore, the designs of the granulating wheel, the screen wheel, and the screen will cause low granulating effects, high fine powder rate, and low granulating efficiency.

According to the feeding mechanism of the present invention, the pressure of a feeding inlet is large, such that if the feeding mechanism is not guaranteely sealed, the powder materials will be sprayed out. Currently, the sealing device of the feeding mechanism is adapted to install a sealing knife or swinging sealing knifes on a feeding outlet of the feeding cylinder, wherein a knife head of the sealing knife is in contact with an outer circumference of the powder sheet pressing wheel to ensure the sealing quality. However, in order to ensure the besting sealing quality, the knife head of the sealing knife must be connected with the outer circumference of the powder sheet pressing wheel to from a high precision and flat sealing line. But, in fact, it is very difficult to approach the two above mentioned sealing knife structures, wherein the sealing knife requires to be processed in high precision technology and the lifespan of the sealing knife will be reduced, and the sealing knife is very inconvenient to be assembled and disassembled.

SUMMARY OF THE PRESENT INVENTION

A main object of the present invention is to provide a dry granulator which is tight in structure, has reliable sealing effects for the feeding mechanism, has high granulating efficiency, and can produce high quality of finished particles products, has a low fine powder rate, is able to be applied to different kinds of mobile powders, and is easy to being automation production Accordingly, all of the above mechanisms are arranged on a front of a machine body, wherein each of the mechanisms are compacted and working with a synergic motion, so as to achieve an automation production and to produce high quality of finished particles products, such that the dry granulator has high working efficiency and low fine powder rates, and the fine powder after screening by the sieving mechanism can be recycled, so as to be applied to a variety of mobile powder.

Preferably, the feeding cylinder is mounted at a horizontal angle of 10 to 30°, wherein there are two feeding screws arranged within the feeding cylinder, and a distance between two feeding screws is less than a total amount of radius of two feeding screws, and each of a top of the feeding screws is a conical structure. The above mentioned feeding device is suitable for different viscosity and mobility powder materials, so as to improve the feeding efficiency and working efficiency of the feeding device. The principle of the above mentioned structure is that: 1. the feeding cylinder is mounted at a horizontal angle to be applied to different viscosity and mobility of powder materials for preventing the diffusion of the powder materials. 2. The two feeding screws are able to improve a pushing pressure during a feeding motion, so as to improve the feeding efficiency. 3. The feeding screws are arranged in a small distance between each other to form a compacted structure, so while the two feeding screws are rotating in the same direction, the powder materials in the central portion between the two feeding screw generate a reactive larger friction force so as to push the powder materials to move forward quickly.

Preferably, a pitch of the rear section of the feeding screw is smaller than that of the middle section of the feeding screw, such that the size of the pitch of the feeding screw is gradually decreased in the rear section of the feeding screw. In addition, a changing range of the pitch is between 25% to 40%. For example, the pitch of the middle section of the feeding screw is 54 mm, and the pitch of the two rear sections of the feeding screw are 35 mm and 25 mm respectively. According to the above mentioned structure, the feeding device is able to solve a leakage problem of the feeding cylinder, so as to improve an integral sealing property. While the feeding device is working, the feeding screw is rotating, and the powder materials are fed into the feeding cylinder via a feeding inlet arranged on middle and an upper wall of the feeding cylinder, so the powder materials will be pushed to a feeding outlet the feeding cylinder. According to the small pitch of the rear portion of the feeding screw, the rear portion of the feeding screw will generate the most powerful pushing force, so the powerful pushing force can efficiently push the powder material forward to a position adjacent to the rear end (sealing portion) of the feeding cylinder, so as to decrease the leakage probability of the powder materials. Therefore, the anti-leakage property of the feeding mechanism is promoted, especially for good mobility powder materials. In other words, the feeding device has the best anti-leakage property even for the good mobility powder materials.

Preferably, the floating sealing device comprises a feeding cylinder, a sealing knife mounted on an outlet of the feeding cylinder, knife base floatingly supported on the sealing knife, screws adapted to mount the knife bases on the feeding cylinder, and elastic pads arranged adjacent with a head portion of the sealing knife, wherein the elastic pads are arranged at the bottom end of the sealing knife. While the screw is in an unlocked state, the elastic pads will generate an elastic force to force the head portion of the sealing knife for moving upwardly, so as to closely touch with an outer circumference of a powder sheet pressing wheel, wherein the head portion of the sealing knife is closely connected with the powder sheet pressing wheel to from a seal.

According to the above mentioned floating sealing device, the knife head of the sealing knife is connected with the outer circumference of the powder sheet pressing wheel to from a high precision and flat sealing line, so as to ensure the secure sealing ability of the feeding mechanism. The working process of the floating sealing device is that: the sealing knife is floatingly arranged on the feeding cylinder, so when the screw is on the unlock state, the elastic pads will generate the elastic force for forcing the head portion of the sealing knife being tilted to remain a flat and high precision of sealing line. In other words, the sealing process of the floating sealing device is a self-automatically operation, such that the head portion of the sealing knife is able to closely connect with the powder sheet pressing wheel to achieve a reliable sealing effect for the feeding mechanism. In addition, the floating sealing device is easy to be assembled and disassembled. In other words, while the screw is tightly screwed on the elastic pad in a lock state, the sealing knife will be tightly pressed on the elastic pad, so the floating sealing device can be easily assembled or disassembled, due to a clearance formed between the sealing knife and the outer circumference of the powder sheet pressing wheel. While the floating sealing device is working during the sealing process, the screw need to be slightly released, so the elastic pad will generate the elastic force for forcing the head portion of the sealing knife. Therefore, the head portion of the sealing knife is closely connected with the outer circumference of the powder sheet pressing wheel.

Another object of the present invention is to provide a floating sealing device which is able to securely seal the feeding mechanism of the dry granulator. In order to support the head portion of the sealing knife being tilted more reasonably, supporting robs are provided at a position which is higher than a height of a bottom and rear end of the knife base.

Preferably, the knife base comprises a small screw installation hole and a large screw installation hole continuously arranged in a rear position of the small screw installation hole, wherein a diameter of the small screw installation hole is larger than that of a shank portion of the screw, and a diameter of the large screw installation hole is larger than that of a shank head of the screw. The advantages of the above floating sealing device are that: 1. the sealing knife can be selectively used or unused without disassembling the screw. 2. the head portion of the sealing knife is tiled reasonably.

Another object of the present invention is to provide a granulating mechanism for the dry granulator which has high granulating effects, a low fine powder rate, and a high granulating efficiency Accordingly, in order to achieve the above objects, a granulating mechanism for the dry granulator comprises a screen granulating device and a granulating wheel device arranged on a top portion of the screen granulating device, The granulating wheel further comprises a right granulating wheel, a left granulating wheel, and a plurality of granulating teeth arranged on an outer circumference of the right and left granulating wheel, wherein the right granulating wheel is rotatably arranged on a right and upper portion adjacent to the left granulating wheel, wherein the granulating teeth are rectangular teeth. The screen granulating device comprises a W-shaped screen, and two screen wheels, which are a left screen wheel and a right wheel screen, arranged in the W-shaped screen. In addition, the screen wheel comprises a plurality of pressing teeth arranged on an outer circumference of the screen wheel, wherein a rear face of the pressing teeth are touched with a screen face of the W-shaped screen. The screen face of the W-shaped screen comprises a plurality of continuously waveform folds arranged in the longitudinal direction, and a plurality of continuously wavy shape, corresponding to the continuously waveform folds, formed in the axial direction of the pressing teeth of the screen wheel.

Preferably, the screen wheel is a hollow structure, wherein the screen wheel comprises a central sleeve, the pressing teeth, a front cover, and a rear cover, wherein a central hole between the front cover and the rear cover is sleeved at two end of the central sleeve respectively. In addition, two ends of the pressing teeth are fixedly arranged on an outer circumference of the front and rear cover.

Preferably, the granulating wheel is a hollow structure, wherein the granulating wheel comprises a central sleeve, the rectangular granulating wheel, a front flange, and a rear flange, wherein a central circular hole between the front flange and the rear flange is fixedly sleeved on two ends of the central sleeve, and the two ends of the rectangular granulating wheel are fixedly arranged on a rectangular slot of an outer circumference between the front and the rear flange.

Advantages of the above mentioned granulating structure are that: 1. a plurality of continuously waveform folds arranged in the longitudinal direction on a screen face of the W-shaped screen, and a plurality of continuous wavy shape, corresponding to the continuously waveform folds, formed in the axial direction of the pressing teeth of the screen wheel are able to provide a relative rotation motion, which is not only provide a pressing granulating process to the powder sheets, but also provide a breaking granulating process thereto. Since the granulating area is much larger than the current granulating mechanism, the granulating mechanism of the present invention has good granulating effects, low powder rates, and high granulating efficiency. 2. the screen wheel is a hollow structure, so during the pressing and breaking process of he granulating mechanism, the large particles, which cannot pass through the meshes of the W-shaped screen, are delivered back to the central hollow space of the screen wheel, and continuously be delivered back to the central portion between the right screen wheel and the left screen wheel to process the granulating process again. In other words, the granulating efficiency is improved. 3. the structure of granulating wheel device thereof is simply, as well as that the powder sheets can be efficiently pressed and broken by rectangular granulating teeth, so as to improve the breaking rate and reduce the fine powder rate. 4. the hollow structure of the granulating wheel is able to achieve the same granulating effect of the screen wheel, so as to achieve the best granulating effects, reduce the fine powder rate, and improve the granulating efficiency.

Another object of the present invention is to provide a sieving device for a dry granular which has good sieving effects and results, and improve the purity of the finished particles products, so as to control the fine powder rate of the finished particle products below 4%.

In order to solve the above problems, the sieving mechanism for dry granular comprises a sieving bucket, sieving trays, powder receiving trays, an inlet arranged on a top wall of the sieving bucket, a fine powder outlet, and a finished powder outlet, wherein the inlet is provided in an upper portion of the sieving bucket, and the finished powder outlet is provided at a lower portion of the sieving bucket. And, the sieving device further comprises a negative pressure system connected with the fine powder outlet, a vibrator adapted to drive the sieving tray, and a slanted tray adapted to feed the powder materials. The sieving tray is located in the sieving bucket to separate the inlet and the finished powder outlet, wherein the sieving tray is driven to work up and down by the vibrator, and the powder receiving tray is located at the bottom of the sieving tray. The sieving tray is connected with the powder receiving tray to form a sealed powder chamber, which is connected to the fine powder outlet. A slope of the sieving tray is gradually decreasing from the center to the surrounding to form a downhill shape, and a slope of the powder receiving tray is gradually increasing from the center to the surrounding to form an uphill shape, wherein an upper face of the powder receiving tray comprises a plurality of steps, continuously connected to form a step-section shape, and a lower face of the powder receiving tray is a downhill shape having an opposite direction of the upper face thereof.

Accordingly, the present invention overcomes technical problems of the dry granulator in the current market, so as to achieve good sieving effects and results, improve the purity of the finished particles products, and control the fine powder rate of the finished particle products to lower than 4%. The working method of the sieving mechanism is: semi-finished particles products are fed from the inlet, and falling down on the upper sieving tray through the feeding tray. Due to the vibration of the sieving tray, the fine powder within the semi-finished particles products are passing through the meshes of the sieving tray, and falling down to the upper face of the powder receiving tray. After that, the fine powder will crawling towards an uphill direction of the upper receiving tray as well as that the powder receiving tray is driven by the vibrator, such that fine powder is gathered on a center of the upper receiving tray along the upper steps until falling down to a fine powder outlet and being smoothly sucked out. After the sieving process, the least amount of fine powder will remain in the finished particle products from the finished powder outlet of the sieving bucket.

Preferably, the sieving tray has two layers, which are an upper sieving tray and a lower sieving tray. And, the powder receiving tray includes an upper receiving tray and a lower receiving tray, wherein the upper receiving tray is mounted at a bottom of the upper sieving tray to form a upper sealed powder chamber, wherein the lower receiving tray is mounted at a bottom of the lower receiving tray to from a lower sealed powder chamber. Therefore, the semi-finished particles products can be screened twice times so as to achieve the best sieving effect.

In order to achieve the best sieving effect, a slope of the downhill sieving tray is 2 to 10°, and a slope of the uphill top face of powder receiving tray is 10 to 30°. A slope of the downhill bottom face of the steps of the powder receiving tray is 2 to 12°.

A main object of the present invention is to provide a pressing wheel regulator for a dry granular which can adjust a radial clearance and an axial position between an upper and a lower pressing wheel of a pressing mechanism.

Accordingly, in order to achieve the above mentioned objects, a pressing wheel regulator for a dry granular according to the preferred embodiment of the present invention is provided, wherein the pressing wheel regulator comprises: a upper pressing wheel and a pressing wheel shaft, wherein the upper pressing wheel fixedly mounted on a top shaft head of the pressing wheel shaft, wherein the pressing wheel shaft is supported within an electronic locking sleeve via a slewing bearing, and the electronic locking sleeve is able to axially move within the sleeves holes of the two bases, wherein one end of the pressing wheel shaft is connected with the electronic locking sleeve, and the other end of the pressing wheel shaft is connected to a cylinder.

According to the above mentioned pressing wheel regulator, while the cylinder is activated, the electronic locking sleeve will be driven to rotate, such that a radial position between the pressing wheel shaft and the upper pressing wheel will be change, so as to adjust a distance of a radial clearance, which is defined between the upper and lower pressing wheel. In addition, cylinder can push the upper pressing wheel to generate enough tableting force as well as that no gasoline gas pollution are generated.

In addition, there are two bases which are arranged at the front and rear end of the pressing wheel shaft, wherein each of the two bases has a sleeve hole, wherein a front end and a rear end of the electronic locking sleeve are supported by the sleeves hole of the two bases respectively. Furthermore, the electronic locking sleeve is axially arranged within the sleeves holes of the two bases, wherein a peripheral of the electronic locking sleeve arranged within the sleeve holes of the two bases comprises a fixed plate, a worm wheel, a rear plain bearing, a plurality of shaft steps, a front plain bearing and a compression spring arranged in the axial direction; wherein the fixed plate is fixed connected to the base, and the worm wheel is movably arranged on the peripheral of the electronic locking sleeve driven by a worm, wherein cam curves are arranged on opposite faces of the fixed plate and the worm wheel respectively, and the shaft steps are fixedly connected to the electronic locking sleeve.

Accordingly, while the worm is rotated, the worm wheel will be driven to rotate, so due to the cam curves arranged on opposite faces of the fixed plate and the worm wheel, the worm wheel will generate a relative movement during rotating, such that shaft steps, the electronic sleeve, and the pressing wheel shaft arranged within the electronic locking sleeve are pushed by the rear plain bearing to process the axial movement, and to adjust the axial position between the upper and lower pressing wheel. Therefore, the degree of error between the height of outer face end for the upper and lower pressing wheel remain in a certain range, so as to prevent the powder leakage phenomenon.

According to the above preferred embodiment of the present invention, the dry granulator is tight in structure, has reliable sealing effects for the feeding mechanism, has high granulating efficiency, produce high quality of finished particles products, has a low fine powder rate, less than 4%, is able to be applied to different kinds of mobile powders, and is easy to being automation production.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1 to FIG. 9 of the drawings, a dry granulator according to a preferred embodiment of the present invention is illustrated, wherein the dry granulator comprises a feeding mechanism 10, a vertical feeding mechanism 20, an oblique feeding mechanism 30, a pressing mechanism 40, a crushing mechanism 50, a granulating mechanism 60, a sieving mechanism 80, and a pressing wheel regulator 90, which are arranged on a front portion of a mechanism body 1.

Figure 1:
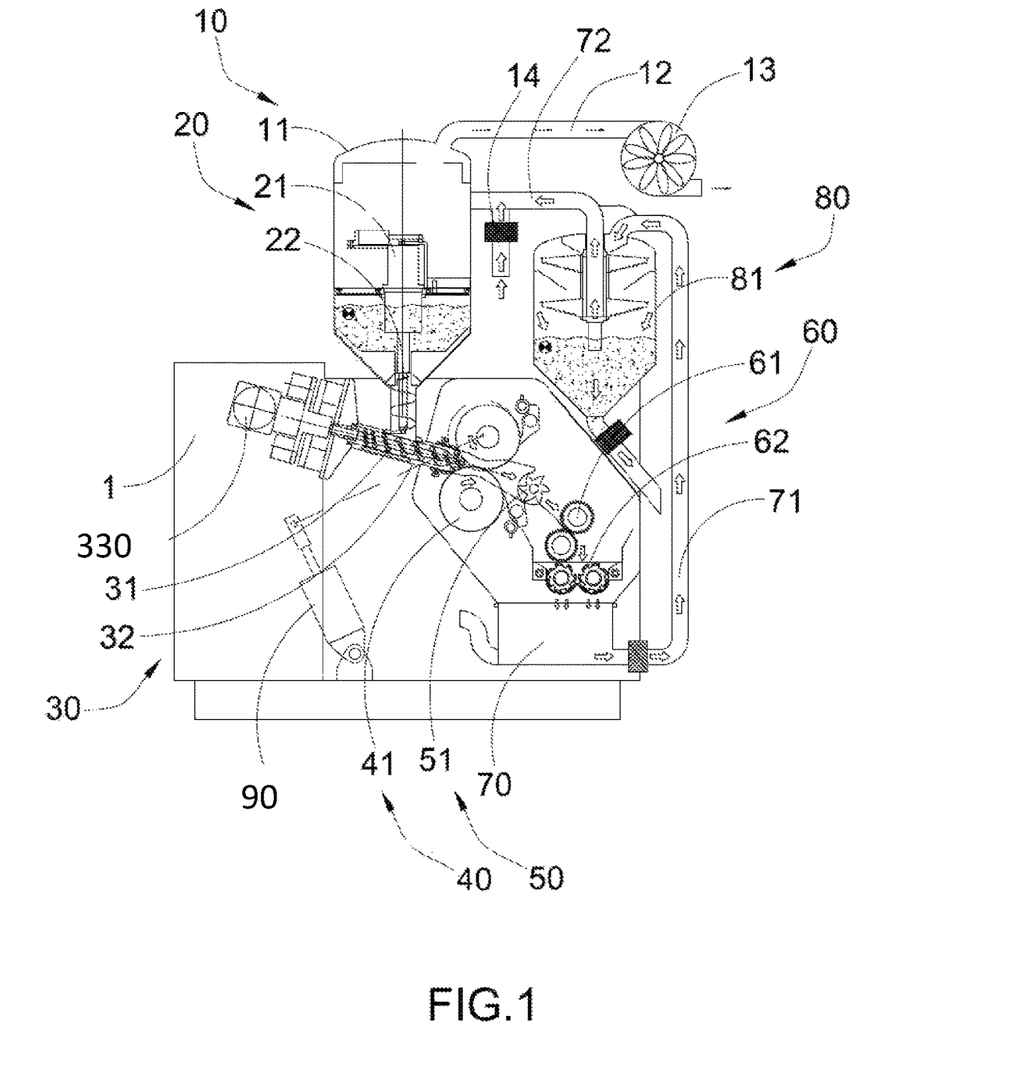
FIG. 1 is a perspective view of a dry granulator according to a preferred embodiment of the present invention.

The feeding mechanism 10 for a dry granular comprises a material tank 11 connected to a vacuum system, an exhaust fan 13, and a fan connection tube 12 connected with the material tank 11, wherein the vacuum system is working, the material tank 11 is in a vacuum situation, such that powder materials will be sucked from a sieving bucket 81 of the sieving mechanism 80 to the material tank 11. The vertical feeding mechanism 20 is arranged within the material tank 11, wherein the vertical feeding mechanism 20 comprises a vertical feeding motor 21 and a vertical feeding screw 22, such that while the vertical feeding motor 21 is working, the vertical feeding screw 22 will be driven to deliver the power materials from the material tank 11 to a bottom outlet of the material tank 11. The oblique feeding mechanism 30 comprises a feeding cylinder 32, a feeding screw 31, a feeding motor 330, and a feeding inlet 320, wherein the feeding cylinder 32 is mounted at a horizontal angle of 10 to 30°, and the feeding inlet 320 is connected with the bottom outlet of the material tank 11, such that the feeding screw 31 is driven by the feeding motor 330 to deliver the powder materials from the material tank 11 to the feeding cylinder 32 via the feeding inlet 320.

Figure 4:
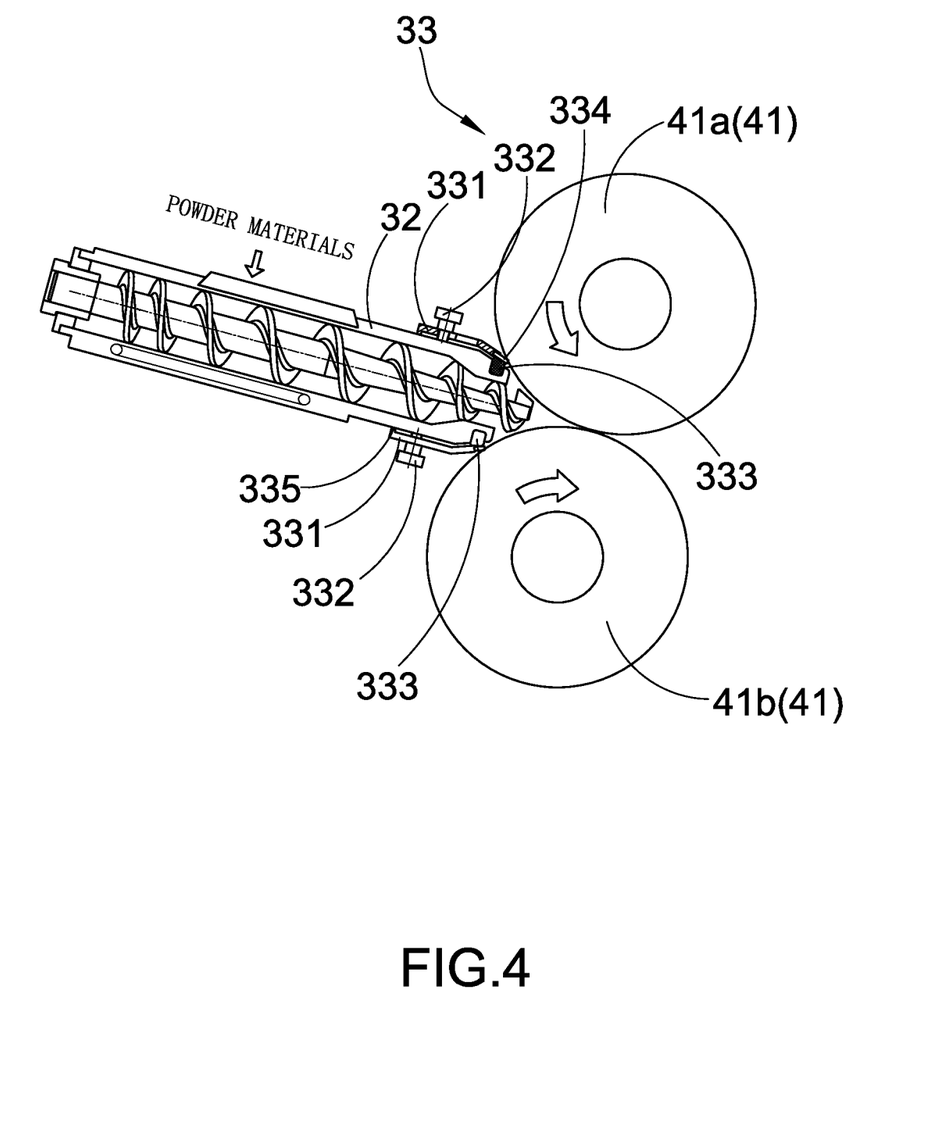
FIG. 4 is a perspective view of a floating sealing device for the feeding mechanism according to the above preferred embodiment of the present invention, illustrating the floating sealing device incorporated with the feeding mechanism.

As shown in FIG. 4, the pressing mechanism 40 comprises an upper pressing wheel 41a and a lower pressing wheel 41b, which are rotating at a reverse direction, wherein the upper pressing wheel 41a and the lower pressing wheel 41b are arranged adjacent to an outlet of the feeding cylinder 32, such that the upper pressing wheel 41a and the lower pressing wheel 41b are able to compress the powder material into powder sheets with qualified hardness and thickness.

The crushing mechanism 50 comprises a crushing wheel 51 arranged on an outlet between the upper pressing wheel 41a and the lower pressing wheel 41b, such that powder sheets can be crushed by the crushing wheel 51.

Figure 6:
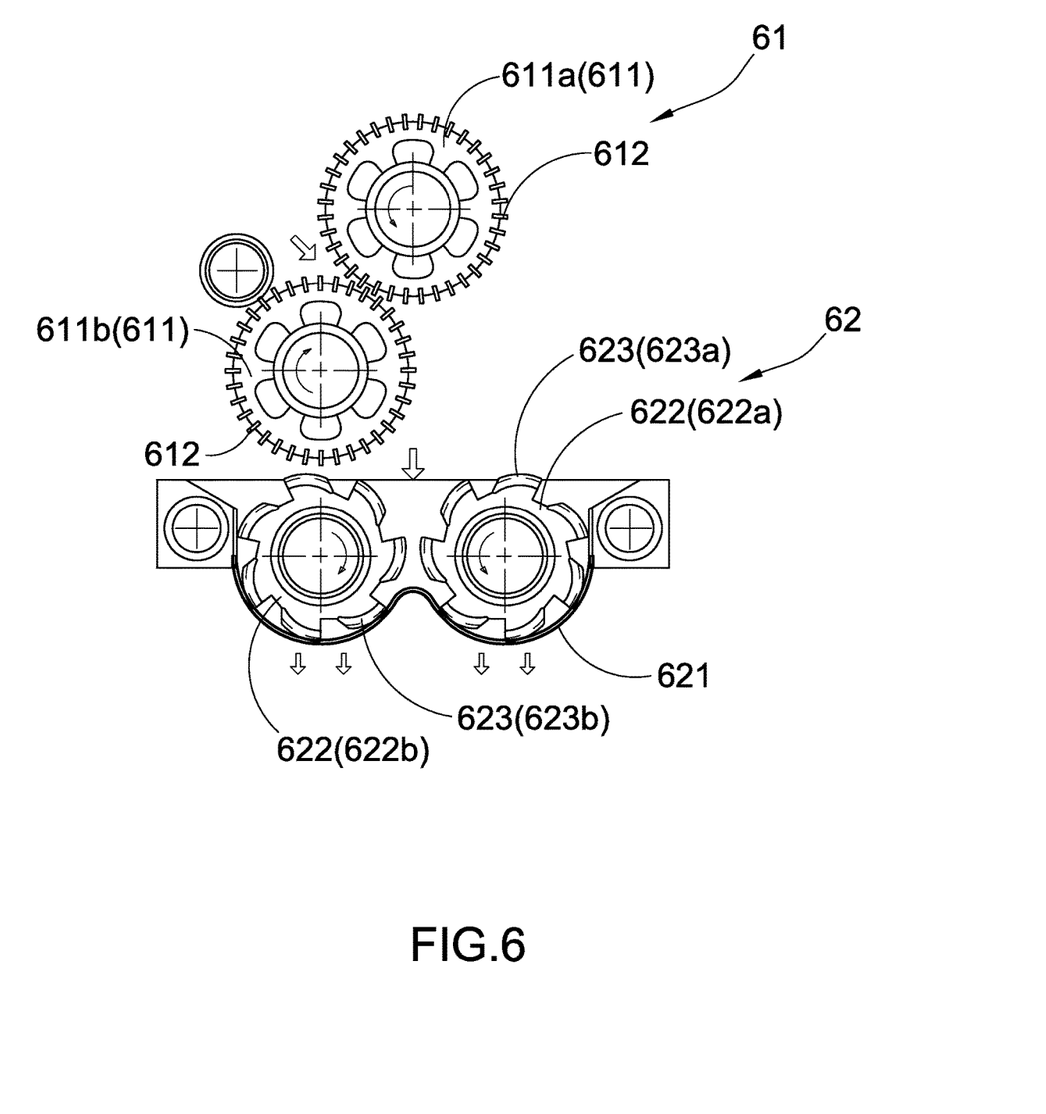
FIG. 6 is a perspective view of a granulating mechanism for the dry granulator according to the above preferred embodiment of the present invention.

As shown in FIG. 6, the granulating mechanism 60 comprises a granulating wheel device 61 and a screen granulating device 62, wherein the granulating wheel device 61 is arranged on a top portion of the screen granulating device, such that the granulating mechanism 60 is able to granulate the crushed powder sheet into finished particles products, so as to deliver to a collection storage 70.

Figure 9:
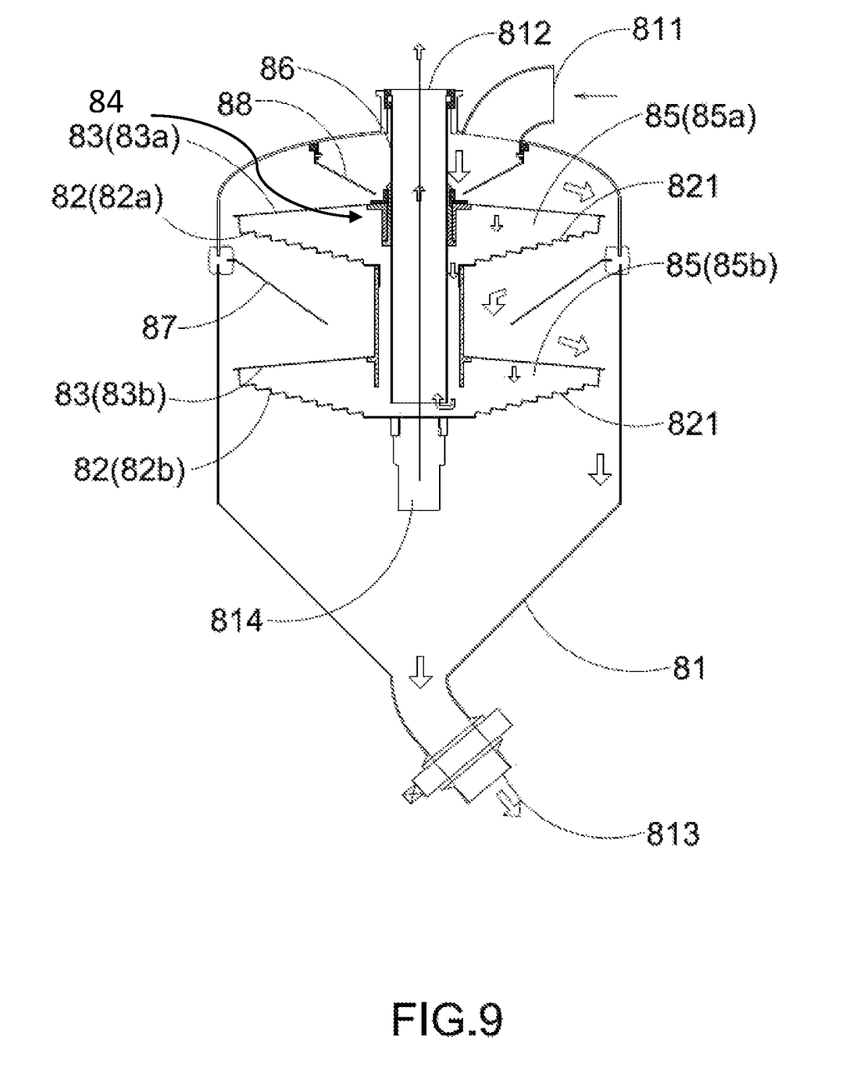
FIG. 9 is a perspective view of a sieving mechanism for the dry granulator according to the above preferred embodiment of the present invention.

As shown in FIG. 9, the sieving mechanism 80 for a dry granular comprises a sieving bucket 81, sieving trays 83, powder receiving trays 82, an sieving inlet 811 arranged on a top wall of the sieving bucket 81, a fine powder outlet 812, a finished powder outlet 813, and a vibrator 84, wherein the sieving inlet 811 is arranged on a top portion of the sieving bucket 80 to connect with the collection storage 70 via a sieving connection tube 71, and the fine powder outlet 812 is connected with the material tank 11 via a fine powder tube 72. The sieving trays 83 are located in the sieving bucket 81 to separate the sieving inlet 811 and the finished powder outlet 813, wherein the sieving trays 83 are driven to work up and down by the vibrator 84, and the powder receiving tray 82 are located at the bottom of the sieving trays 83 to form a sealed powder chamber 85, wherein the sealed powder chamber 85 is linked with the fine powder outlet 812.

Figure 2:
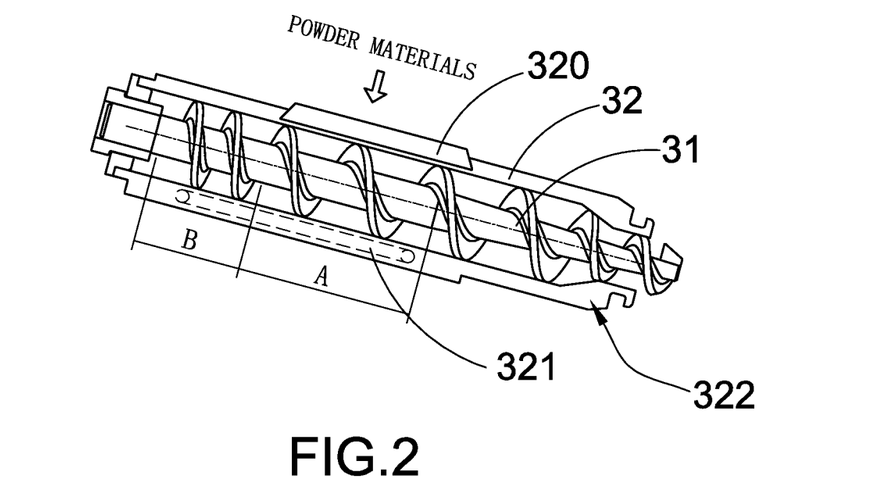
FIG. 2 is a perspective view of a feeding mechanism for the dry granulator according to the above preferred embodiment of the present invention.
Figure 3:
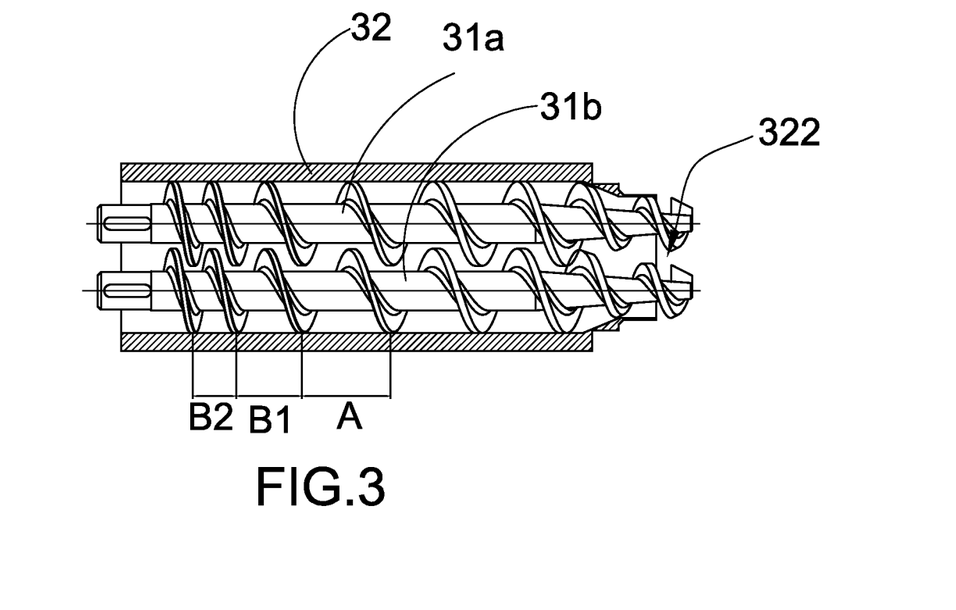
FIG. 3 is a perspective view of the feeding mechanism for the dry granulator according to the above preferred embodiment of the present invention, illustrating two feeding screws arranged within a feeding cylinder.

As shown in FIG. 2 and FIG. 3, there are two feeding screws 31a, 31b arranged within the feeding cylinder 32, wherein a distance between two feeding screws 31a, 31b is less than a total amount of radius of two feeding screws 31a, 31b, and each of a top of the feeding screws 31(31a, 31b) is a conical structure, and the feeding inlet 320 is arranged on the top wall of the feeding cylinder 32. In addition, a rear section B of the feeding screw 31 has a smaller pitch compared to a middle section A of the feeding screw 31. In other words, a size of the pitch of the feeding screw 31 is gradually decreased from the middle section of the feeding screw 31 to the rear section thereof. Furthermore, a changing range of the pitch from the rear section B to the middle section A is between 25% to 40%. For example, the pitch of the middle section A is 54 mm, and the pitch of the two rear sections B1, B2 are 35 mm and 25 mm respectively. And, a cooling water passage 321 is arranged at a bottom portion of the feeding cylinder 32

Figure 5:
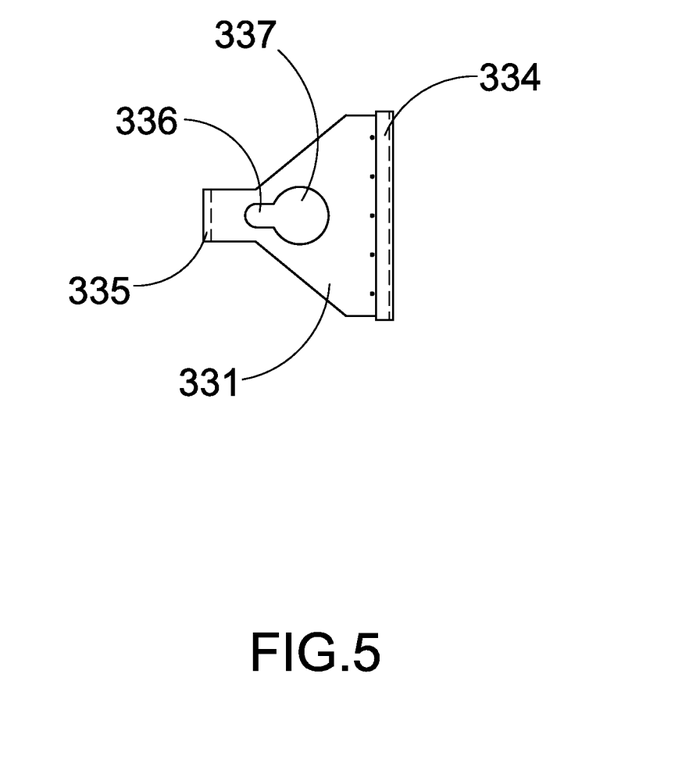
FIG. 5 is a top view of the floating sealing device for the feeding mechanism according to the above preferred embodiment of the present invention.

Referring to FIG. 4 to FIG. 5 of the drawings, the feeding mechanism 10 for the dry granulator further comprises a floating sealing device 33 mounted on the feeding cylinder 32, wherein the floating sealing device 33 comprises a sealing knife mounted on an feeding outlet of the feeding cylinder 32, knife base 331 floatingly supported on the sealing knife, supporting rob 335 arranged on position that is higher than a rear and bottom end of the knife base 331, screws 332 adapted to mount the knife bases 331 with the feeding cylinder 32, and elastic pads 333 arranged adjacent with a head portion 334 of the sealing knife, wherein the elastic pads 333 are arranged at the bottom portion of the sealing knife. While the screws 332 are in an unlocked state, the elastic pads 333 will generate an elastic force for forcing the head portion 334 of the sealing knife to move upwardly, so as to closely touch with an outer circumference of the pressing wheel 41, wherein the head portion 334 of the sealing knife is closely connected with the pressing wheel 41 to from a sealing situation. Furthermore, the knife base 331 comprises a small screw installation hole 336 and a large screw installation hole 337 continuously formed with the small screw installation 336, wherein a diameter of the small screw installation hole 336 is larger than that of a shank portion of the screw 332, and a diameter of the large screw installation hole 337 is larger than that of a shank head of the screw 332

Figure 7:
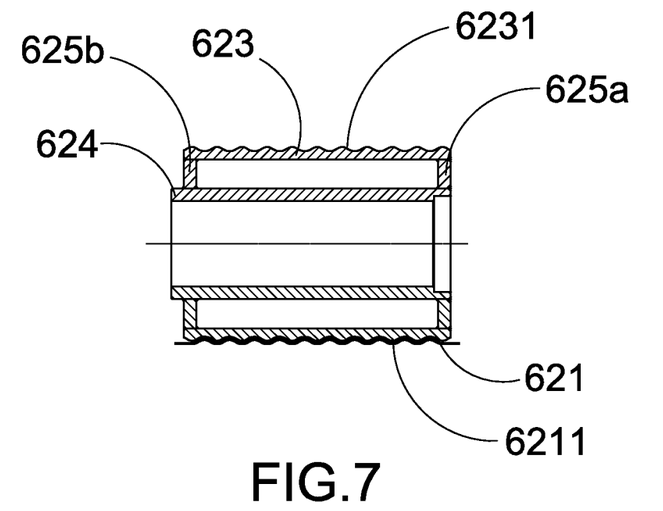
FIG. 7 is a cross sectional view of a screen granulating device for the granulating mechanism according to the above preferred embodiment of the present invention.
Figure 8:
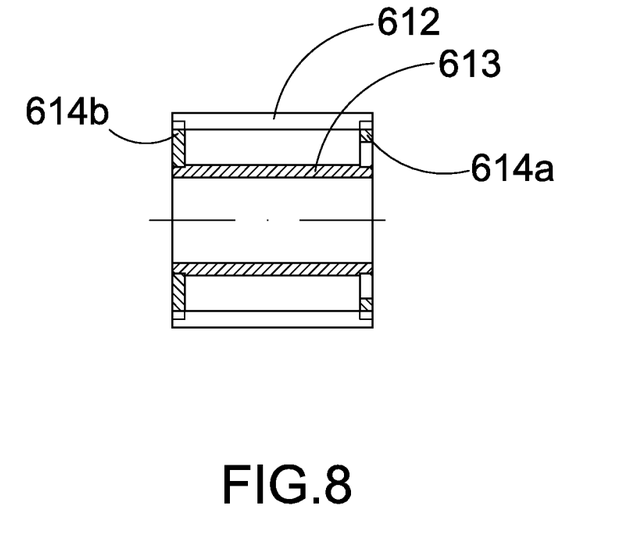
FIG. 8 is a cross sectional view of a granulating wheel device for the granulating mechanism according to the above preferred embodiment of the present invention.

Referring to FIG. 6 to FIG. 8 of the drawings, the granulating wheel device 61 comprises a right granulating wheel 611a, a left granulating wheel 611b, and a plurality of granulating teeth 612 arranged on an outer circumference of the right and left granulating wheel 611a, 611b, wherein the right granulating wheel 611a is rotatably arranged on a right and upper portion adjacent to the left granulating wheel 611b, wherein the granulating teeth 612 are rectangular teeth. As shown in FIG. 8, the granulating wheels 611 are a hollow structure, wherein the granulating wheel 611 comprises a central sleeve 613, the rectangular granulating teeth 612, a front flange 614a, and a rear flange 614b, wherein a central circular hole between the front flange 614a and the rear flange 614b is fixedly sleeved on two ends of the central sleeve 613, wherein the two ends of the rectangular granulating teeth 612 are fixedly arranged on a rectangular slot of an outer circumference between the front and the rear flange 614a, 614b.

The screen granulating device 62 comprises a W-shaped screen 621, and two screen wheels 622, which is a left screen wheel 622b and a right wheel screen 622a, wherein the screen wheel 622 comprises a plurality of pressing teeth 623 arranged on an outer circumference of the screen wheel 622, wherein a rear end of the pressing teeth 623 are touched with a screen face of the W-shaped screen 621. The screen face of the W-shaped screen 621 comprises a plurality of continuously waveform folds 6211 arranged in the longitudinal direction, and a plurality of continuous wavy shape 6231, corresponding to the continuously waveform folds 6211 formed in the axial direction of the pressing teeth 623 of the screen wheel 622. The screen wheel 622 is a hollow structure, wherein the screen wheel 622 further comprises a central sleeve 624, a front cover 625a, and a rear cover 625b, wherein a central hole between the front cover 625a and the rear cover 625b is sleeved at two end of the central sleeve 624 respectively. In addition, two ends of the pressing teeth 623 are fixedly arranged on an outer circumference of the front and rear cover 625a, 625b.

Referring to FIG. 9 of the drawings, the sieving mechanism 80 comprises a sieving bucket 81, sieving trays 83, powder receiving trays 82, an sieving inlet 811 arranged on a top wall of the sieving bucket 81, a fine powder outlet 812, and a finished powder outlet 813, wherein the fine powder outlet 812 and the sieving inlet 811 are provided in an upper wall portion of the sieving bucket 81, and the finished powder outlet 813 is provided at a lower wall portion of the sieving bucket 81. And, the sieving mechanism 80 further comprises a negative pressure system connected with the fine powder outlet 812, a vibrator 84 adapted to drive the sieving tray 83, and a slanted tray 88 adapted to load the powder materials. The sieving trays 83 are located in the sieving bucket 81 to separate the sieving inlet 811 and the finished powder outlet 813, wherein the sieving trays 83 are driven to work up and down by the vibrator 84 and the powder receiving trays 82 are located at the bottom of the sieving tray 83.

Moreover, the sieving tray 83 has two trays, which are an upper sieving tray 83a and a lower sieving tray 83b. And, the powder receiving tray 82 includes an upper receiving tray 82a and a lower receiving tray 82b, wherein the upper receiving tray 82a is mounted at a bottom of the upper sieving tray 83a to form a upper sealed powder chamber 85a, wherein the lower receiving tray 82b is mounted at a bottom of the lower sieving tray 83b to from a lower sealed powder chamber 85b. Furthermore, the sieving mechanism 80 further comprises a powder passage 86 adapted to connect with the upper and lower sealed powder chamber 85a, 85b and the fine powder outlet 812, and a guiding tray 87 located between the upper and lower sieving tray 83a, 83b for guiding the powder materials which do not pass through the upper sieving tray 83a to approach the lower sieving tray 83b. Furthermore, a slope of the sieving tray 83 is gradually decreasing from a center portion to a surrounding portion to form a downhill shape, wherein the slope of the downhill shape slope is 2 to 10°. In addition, a slope of the powder receiving tray 82 is gradually increasing from a center portion to a surrounding portion to form an uphill shape, wherein the slope of the uphill shape is 10 to 30°. An upper face of the powder receiving tray 82 comprises a predetermined number of steps 821, continuously connected to form a step-section shape, and a lower face of the powder receiving tray 82 is a downhill shape having an opposite direction of the steps 821, wherein the slope of the downhill shape is 2 to 12°. Preferably, the number of the steps 821 is eight.

Figure 10:
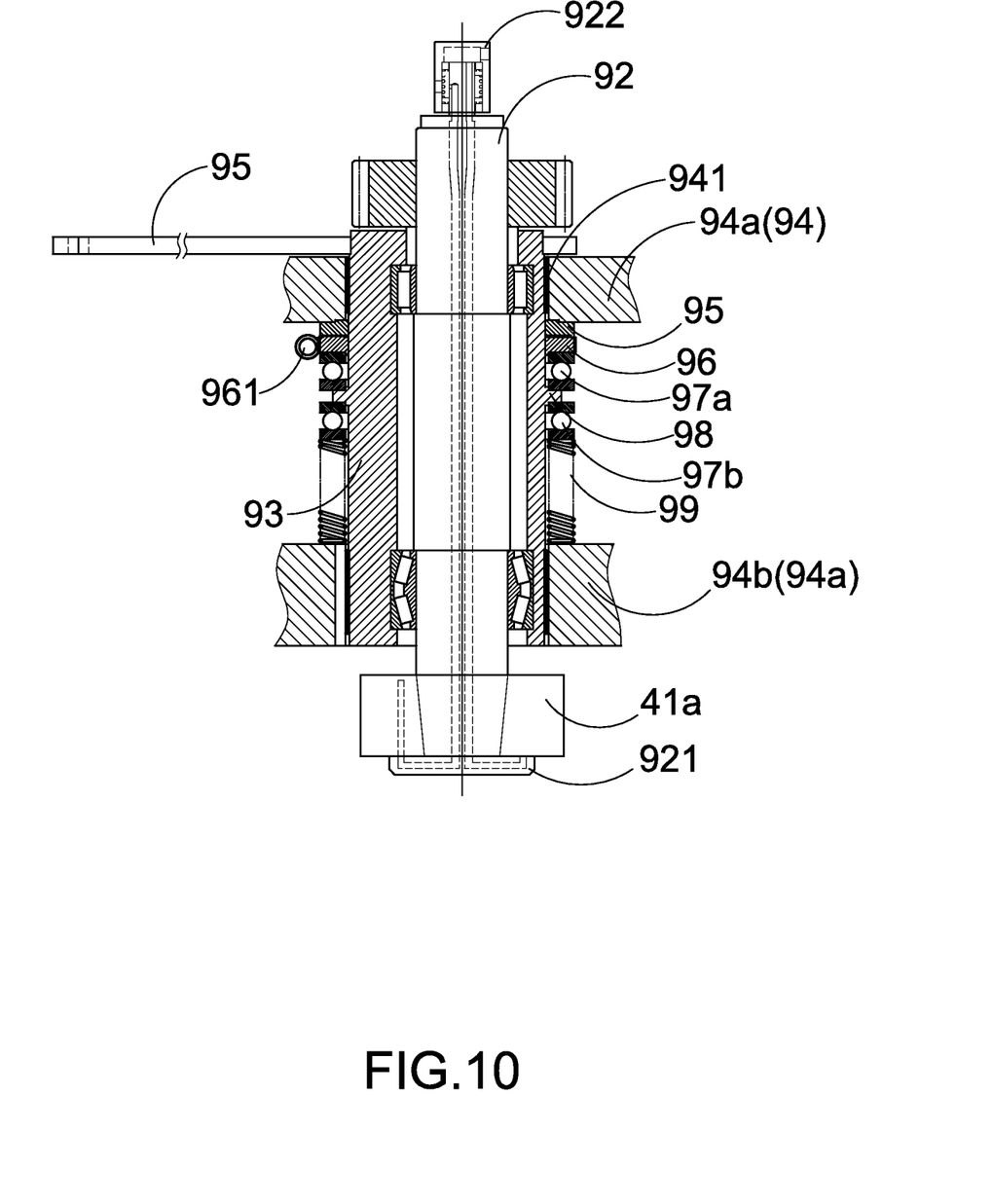
FIG. 10 is a cross sectional view of a pressing wheel regulator for the dry granulator according to the above preferred embodiment of the present invention, illustrating the pressing wheel regulator incorporated with an upper pressing wheel of a pressing mechanism.

Referring to FIG. 10 of the drawing, a pressing wheel regulator 90 for a dry granulator is linked with the upper pressing wheel 41a, wherein the pressing wheel regulator 90 comprises a pressing wheel shaft 92 having a top shaft head adapted to be mounted with the upper pressing wheel 41a, an electronic locking sleeve 93 applied to support the pressing wheel shaft 92 via a slewing bearing, and a base 94 having a sleeve hole applied to moveably arranged the electronic locking sleeve 93 therein, wherein a connection hole between the upper pressing wheel 41a and the pressing wheel shaft 92 is a tapered hole, and in other words, the top shaft head of the pressing wheel shaft 92 is a tapered head.

Accordingly, the pressing wheel regulator 90 further comprises a shaft section 95 and roller needles 941 are arranged within the sleeve hole of the base 94, wherein one end of the shaft section 95 connected with the electronic locking sleeve 93, and the other end of the shaft section 95 is connected to a cylinder 96 (as shown in FIG. 1). In addition, the base 94 includes a front base 94a and a rear base 94b, mounted at a front and a rear end of the electronic locking sleeve 93 respectively, wherein the front end of the electronic locking sleeve 93 is supporting within the sleeve hole of the front base 94a, and the rear end of the electronic locking sleeve 93 is supported within the sleeve hole of the rear base 94b. In addition, the electronic locking sleeve 93 is able to axially move within the sleeves holes of the two bases 94, wherein a peripheral of the electronic locking sleeve 93, arranged within the sleeve holes of the two bases 94 respectively, comprises a fixed plate 95, a worm wheel 96, a rear plain bearing 97a, a plurality of shaft steps 98, a front plain bearing 97b, cam curves are arranged on opposite faces of the fixed plate 95 and the worm wheel 96, and a compression spring 99 respectively arranged in the axial direction, wherein the fixed plate 95 is fixed connected to the front base 94a, and the worm wheel 96 is movably arranged on the peripheral of the electronic locking sleeve 93 adapted to move along the electronic locking sleeve 93 in the axial and rotation movement, wherein the movement of the worm wheel 96 is driven by a worm 961. Furthermore, two ends of the worms 961 is mounted on the front base 94a, so when the worm wheel 96 and the foxed plate 95 generate a relative movement, the worm wheel 96 will generate a certain amount of axial displacement, as well as that the shaft step 98 and the electronic sleeve 93 is formed an integral structure.

The pressing wheel regulator further comprises a pressing cover 922 mounted on a front end of the pressing wheel shaft 92, a water inlet ring 921 mounted on a rear end of the pressing wheel shaft 92, an internal cooling passage arranged within the pressing wheel shaft 92, wherein a rear end of the cooling water passage is communicated with an inlet of the water-inlet ring 921, and in other words, the rear end of the cooling water passage is embedded with the pressing cover 922. In addition, a front end of the internal cooling passage is embedded within a cooling hole in the upper pressing wheel 41a.

A working method for a dry granulator according to the above preferred embodiment of the present invention is illustrated, wherein the working method comprises steps of:

1. starting a exhaust fan 13 to perform a negative pressure for a material tank 11, wherein powder materials are sucked from a sieving bucket 81 to the material tank 1 via a bucket connection tube 14, and then the exhaust fan 13 is stopped until the material tank 11 is full of powder materials, so as to complete a powder materials loading motion. In addition, the sieving bucket 81 is also in a vacuum situation.

2. starting a vertical feeding motor 21, such that a vertical feeding screw 23 will be driven by the vertical feeding motor 21 to deliver the powder materials from a bottom outlet of the material tank 11 to an upper feeding inlet 320 of the feeding cylinder 32, and continuously, a feeding screw 31 is activated by a feeding motor 330 to deliver the powder materials to a clearance between a upper pressing wheel 41a and the lower pressing wheel 41b, so as to complete a feeding motion.

3. pressing the powder materials by a counter-rotation motion between the upper pressing wheel 41a and the lower pressing wheel 41b, so the powder materials will be pressed to form powder sheets with qualified hardness and thickness, so as to complete a pressing motion.

4. activating a crushing wheel 51 to completely crush the powder sheets to generate crushed powder sheets, so as to complete a crushing motion.

5. delivering crushed powder sheets into a central portion between a left and right granulating wheel 611a, 611b, and then the crushed powder sheets will be broken to generate broken powder sheets, such that left granulating wheel 611a and the right granulating wheel 611b are relatively rotating, and continuously, broken crushed powder sheets are continuously delivered to a central portion between a right screen wheel 622a and a left screen wheel 622b, wherein the broken powder sheets will be pressed within a W-shaped screen 621 due to the relative rotation motion between the screen wheel 622 and the W-shaped screen 621. Therefore, while a granulating motion is completed and semi-finished particles products are delivered to a collection storage 70.

6. delivering the semi-finished particles products from the collection storage 70 to an inlet 811 of the sieving bucket 81 via a sieving connection tube 71, and the semi-finished particles products are falling on a upper sieving tray 83a through a feeding tray 88 to process a first time sieving, wherein the semi-finished mixed particles which did not mesh by the upper sieving tray 83a will be guiding to a lower sieving tray 83b through the guiding tray 87 to process a second time sieving. And, the upper sieving tray 83a, the lower sieving tray 83b, the upper powder receiving tray 82a, and the lower powder receiving tray 82b are driven by a vibrator 84, and during the first time sieving, when most of the fine powder are separated from the finished powder particles and fell down on steps 821 of the upper powder receiving tray 82a through the upper sieving tray 83a, the fine powders are crawling towards the uphill direction of the upper receiving tray 82a, so the remaining fine powders are gathered on a center portion of the upper receiving tray 82a along the steps 821, and then falling down to a bottom opening of the powder passage 86 to be smoothly sucked out to the material tank 11.

In the above step 6, the sieving bucket 81 is in a vacuum situation.

In the above step 6, the fine powders are recycled. And, in the sieving bucket 81, the semi-finished particle products are processing by twice times sieving, such that after processing twice times sieving, the fine powder rate of the finished particles does not exceed 4% investigated from the finished powder outlet 813 of the sieving bucket 81.

According to the above mentioned working method of the dry granulator, the dry granulator of the present invention is able to provide an automated production, provide a high working efficiency, provide high quality finished particles, low fine powder rates, which is lower than 4%, and be applied to a variety kinds of mobile powders.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A dry granulator, comprising:
a feeding mechanism comprising a material tank, having a bottom outlet, connected to a vacuum system adapted to suck powder materials into said material tank;
a vertical feeding mechanism, arranged within said material tank, comprising a vertical feeding motor and a vertical feeding screw, to deliver said power materials to said bottom outlet of said material tank;
a pressing mechanism, comprising an upper pressing wheel and a lower pressing wheel, rotating at a reverse direction;
an oblique feeding mechanism, comprising a feeding cylinder, a feeding screw, a feeding motor, and a feeding inlet arranged on a top wall face of said feeding cylinder and connected with said bottom outlet of said material tank, to deliver said powder materials from said vertical feeding mechanism to said pressing mechanism, wherein said powder materials is compressed by said pressing mechanism into powder sheets with qualified hardness and thickness;
a crushing mechanism, comprising a crushing wheel arranged on an outlet between said upper pressing wheel and the lower pressing wheel, to crush said powder sheets into crushed powder sheets;
a granulating mechanism, comprising a screen granulating device and a granulating wheel device arranged on a top portion of said screen granulating device to granulate said crushed powder sheets into finished particle products, so as to deliver to a collection storage;
a sieving mechanism operatively connected with said collection storage and said material tanks to separate said finished particle products with fine powders;
a pressing wheel regulator comprising a pressing wheel shaft having a top shaft head fixedly arranged on said upper pressing wheel to adjust an axial position of said lower and said upper pressing wheel; and a floating sealing device mounted on said feeding cylinder, wherein said floating sealing device for providing a sealing effect for said feeding mechanism; and
a mechanism body having a front portion, wherein said feeding mechanism, said vertical feeding mechanism, said oblique feeding mechanism, said pressing mechanism, said crushing mechanism, said granulating mechanism, said sieving mechanism, and said pressing wheel regulator are arranged on said front portion of said mechanism body.

2. The dry granulator, as recited in claim 1, wherein said vertical feeding screw is driven by said vertical feeding motor to deliver said powder material to said bottom outlet of said material tank.

3. The dry granulator, as recited in claim 1, wherein said feeding screw is driven by said feeding motor to deliver said powder materials from said vertical feeding mechanism to said pressing mechanism.

4. The dry granulator, as recited in claim 1, wherein said feeding cylinder is mounted at a horizontal angle of 10 to 30°.

5. The dry granulator, as recited in claim 2, wherein said oblique feeding mechanism further comprises another feeding screw, wherein said two feeding screws are arranged within said feeding cylinder, wherein a distance between said two feeding screws is less than a total amount of radius of said two feeding screws, and each of a top of said feeding screws is a conical structure.

6. The granulator, as recited in claim 5, wherein a pitch of each of said feeding screws is gradually decreased from a middle section to a rear section thereof.

7. The granulator, as recited in claim 5, wherein a cooling water passage is arranged at a bottom portion of said feeding cylinder.

8. The dry granulator, as recited in claim 1, wherein said sieving mechanism comprises a sieving bucket, a sieving tray, powder receiving trays located at a bottom of said sieving trays to form a sealed powder chamber, an sieving inlet arranged on a top wall of said sieving bucket connected to said collection storage via a fine powder tube, wherein said sieving mechanism further has a fine powder outlet operatively linked with said material tank, a finished powder outlet operatively linked with said sealed powder chamber, wherein said sieving mechanism further comprises a slanted tray adapted to feed said powder materials, and a vibrator adapted to drive said sieving tray working up and down, wherein said sieving tray is located in said sieving bucket to separate said sieving inlet and said finished power outlet.

9. The dry granulator, as recited in claim 8, wherein said sieving tray includes an upper sieving tray and a lower sieving tray, and said powder receiving tray includes an upper receiving tray and a lower receiving tray, wherein said upper receiving tray is mounted at a bottom of said upper sieving tray to form a upper sealed powder chamber, wherein said lower receiving tray is mounted at a bottom of said lower sieving tray to from a lower sealed powder chamber.

10. The dry granulator, as recited in claim 9, wherein said sieving mechanism further comprises a powder passage connecting said upper sealed powder chamber, said lower sealed powder chamber, and said fine powder outlet, and a guiding tray located between said upper and said lower sieving tray for guiding said powder materials, without passing through said upper sieving tray, to said lower sieving tray.

11. The dry granulator, as recited in claim 9, wherein an upper face of said powder receiving tray comprises a predetermined amount of steps, which are continuously connected to form a step-section shape, and a lower face of said powder receiving tray which is a downhill shape having an opposite direction of said steps, wherein a slope of said downhill shape is 2 to 12°.

12. The dry granulator, as recited in claim 11, wherein a slope of said sieving tray is gradually decreasing from a center to a surrounding to form a downhill sieving tray, wherein a slope of said downhill sieving tray is 2 to 10°, and a slope of said powder receiving tray is gradually increasing from a center to a surrounding to form an uphill powder receiving tray, wherein a slope of said uphill powder receiving tray is 10 to 30°.

13. The dry granulator, as recited in claim 1, wherein said floating sealing device comprises a sealing knife mounted on a feeding outlet of said feeding cylinder, at least a knife base floatingly supported on said sealing knife, a supporting rob arranged on a position that is higher than a rear and bottom end of said knife base, screws adapted to mount said knife base with said feeding cylinder, and elastic pads arranged adjacent with a head portion of said sealing knife and at a bottom portion of said sealing knife.

14. The dry granulator, as recited in claim 13, wherein while said screws are in an unlocked state, said elastic pads generate an elastic force forcing said head portion of said sealing knife to move upwardly to closely touch with an outer circumference of said pressing wheel.

15. The dry granulator, as recited in claim 13, wherein said knife base comprises a small screw installation hole and a large screw installation hole integrally formed with said small screw installation hole, wherein a diameter of said small screw installation hole is larger than that of a shank portion of a screw, and a diameter of said large screw installation hole is larger than that of a shank head of said screw.

16. The dry granulator, as recited in claim 1, wherein said granulating wheel device comprises a left granulating wheel, a right granulating wheel rotatably arranged on a right and upper portion adjacent to said left granulating wheel, and a plurality of rectangular granulating teeth arranged on an outer circumference of each of said right granulating wheel and said left granulating wheel.

17. The dry granulator, as recited in claim 16, wherein each of said left granulating wheel and said right granulating wheel is a hollow structure, wherein each of said left granulating wheel and said right granulating wheel comprises a central sleeve, a front flange, and a rear flange, wherein a central circular hole between said front flange and said rear flange is fixedly sleeved on two ends of said central sleeve, wherein two ends of said rectangular granulating teeth are fixedly arranged on a rectangular slot of an outer circumference between said front and said rear flange.

18. The dry granulator, as recited in 1, wherein said screen granulating device comprises a W-shaped screen, a left screen wheel and a right screen wheel, wherein each of said left screen wheel and said right screen wheel comprises a plurality of pressing teeth arranged on an outer circumference thereof, wherein rear ends of said pressing teeth are touched with a screen face of said W-shaped screen.

19. The dry granulator, as recited in claim 18, wherein a screen face of said W-shaped screen comprises a plurality of continuously waveform folds arranged in a longitudinal direction, wherein said pressing teeth have a continuous wavy shape, corresponding to said plurality of continuously waveform folds, formed in an axial direction.

20. The dry granulator, as recited in claim 18, wherein each of said left screen wheel and said right screen wheel is a hollow structure and comprises a central sleeve, a front cover, and a rear cover, wherein a central hole between said front cover and said rear cover is sleeved at two ends of said central sleeve respectively, and two ends of said pressing teeth are fixedly arranged on an outer circumference of each of said front cover and said rear cover.

21. The dry granulator, as recited in 1, wherein a connection hole provided between said upper pressing wheel and said pressing wheel shaft is a tapered hole, and said top shaft head of said pressing wheel shaft is a tapered head.

22. The dry granulator, as recited in claim 1, wherein said pressing wheel regulator further comprises an electronic locking sleeve supporting said pressing wheel shaft via a slewing bearing, a base having a sleeve hole moveably arranged said electronic locking sleeve therein, roller needles arranged within said sleeve hole of said base, and a shaft having one end connected with said electronic locking sleeve and another end connected to a cylinder.

23. The dry granulator, as recited in claim 22, wherein said base comprises a front base and a rear base, arranged at a front and a rear end of said electronic locking sleeve respectively, wherein said front end of said electronic locking sleeve is supported within said sleeve hole of said front base, and said rear end of said electronic locking sleeve is supported within said sleeve hole of said rear base.

24. The dry granulator, as recited in claim 22, wherein said electronic locking sleeve is able to axially move within said sleeve hole of said base.

25. The dry granulator, as recited in claim 23, wherein a peripheral of said electronic locking sleeve comprises a fixed plate, a worm wheel driven by a worm, a rear plain bearing, a plurality of shaft steps, a front plain bearing, cam curves arranged on opposite faces of said fixed plate and said worm wheel respectively, and a compression spring arranged in an axial direction thereof, wherein said fixed plate is fixedly connected to said front base, and said worm wheel is movably arranged on said peripheral of said electronic locking sleeve to move along said electronic locking sleeve in an axial and rotation movement.

26. The dry granulator, as recited in claim 25, wherein two ends of said worm are arranged on said front base, wherein when said worm wheel and said fixed plate generate a relative movement, said worm wheel generates a predetermined amount of axial displacement.

27. The dry granulator, as recited in claim 22, wherein said pressing wheel regulator further comprises a pressing cover operatively linked with a front end of said pressing wheel shaft, a water inlet ring operatively mounted on a rear end of said pressing wheel shaft, and an internal cooling passage arranged within said pressing wheel shaft, wherein a rear end of said cooling water passage is communicated with an inlet of said water-inlet ring, and a front end of said internal cooling passage is embedded in a cooling hole of said upper pressing wheel.

\* \* \* \* \*